United States Patent [19]

Moeglich

[11] 4,131,526
[45] Dec. 26, 1978

[54] PROCESS AND APPARATUS FOR REMOVAL OF CONTAMINANTS FROM WATER

[75] Inventor: Karl Moeglich, Williamsville, N.Y.

[73] Assignee: Westinghouse Electric Corp., Pittsburgh, Pa.

[21] Appl. No.: 835,377

[22] Filed: Sep. 21, 1977

Related U.S. Application Data

[63] Continuation of Ser. No. 573,577, Apr. 30, 1975, abandoned.

[51] Int. Cl.$^2$ ............................ C02B 1/82; C25B 3/02
[52] U.S. Cl. .................................. 204/149; 204/1 R; 204/152
[58] Field of Search ............... 204/149, 152, 1 R, 225, 204/114; 210/42, 44

[56] References Cited

U.S. PATENT DOCUMENTS

| | | | |
|---|---|---|---|
| 3,457,152 | 7/1969 | Maloney, Jr. et al. | 204/131 |
| 3,755,114 | 8/1973 | Tarjanyi et al. | 204/114 |
| 3,764,499 | 10/1973 | Okubo et al. | 204/152 X |
| 3,766,034 | 10/1973 | Veltman | 204/149 |
| 3,778,307 | 12/1973 | Beer et al. | 204/149 X |
| 3,888,756 | 6/1975 | Teshima et al. | 204/149 X |
| 3,915,822 | 10/1975 | Veltman | 204/149 X |
| 3,919,062 | 11/1975 | Lundquist, Jr. et al. | 204/149 |
| 3,969,201 | 7/1976 | Oloman et al. | 204/1 R X |

*Primary Examiner*—Arthur C. Prescott
*Attorney, Agent, or Firm*—LeBlanc & Shur

[57] ABSTRACT

Oxidizable contaminants in waters, such as feed waters and waste waters wherein they are present in relatively large or small proportions, are removed therefrom by alternating current electrolysis in an electrolytic cell containing catalyst-containing particles, the catalyst of which is an oxidation catalyst such as $MnO_2$, $Cr_2O_3$, $Bi_2O_3$, or $PbO_2$. The process and apparatus of the invention are especially useful for the removal of difficultly oxidizable impurities, such as phenol, from dilute aqueous solutions or dispersions. Included within the invention is the improved removal of such impurities by sequential treatments in accordance with the described processes. Also disclosed are the production of hydrogen peroxide by alternating current electrolysis of water; the oxidation of phenolic compounds; the reactivation of at least partially inactivated carbon adsorbents by subjection to alternating current; and the concentration of chemical impurities from activated carbon by adsorption on particles thereof, followed by desorption by application by alternating current.

20 Claims, 4 Drawing Figures

PROCESS AND APPARATUS FOR REMOVAL OF CONTAMINANTS FROM WATER

This is a continuation, of application Serial No. 573,577 filed Apr. 30, 1975, now abandoned.

This application relates to a process for the removal of oxidizable contaminants from aqueous media and to an apparatus useful in the practice of such a process. More particularly, it relates to the employment of an electrolytic cell in which an oxidizable contaminant, such as phenol, is converted to an innocuous product or products, preferably gases, by an alternating current passed between suitable electrodes and through the aqueous medium and a packed bed of suitable oxidation catalyst-containing particles. The invention also relates to the making of hydrogen peroxide, which may be consumed in oxidation of oxidizable impurities in the aqueous medium charged.

For the purification of water supplies and for the treatment of waste waters, such as the discharges from manufacturing processes, sewage disposal plants and chemical operations, it is often important or at least desirable to remove material from the aqueous medium which would otherwise be objectionable in it. For example, in water supplies it is important to remove poisonous and malodorous chemicals, such as cyanides and phenolics and such compounds should be removed from waste effluents too. Other materials which may be present in waste waters and which are oxidizable in the waters into which the effluents are discharged, thereby creating an oxygen demand, should also be removed. Otherwise, rivers and lakes into which the effluents are ultimately drained will be depleted in oxygen, making them poor habitats for fish and marine life.

In the past, effluents have been treated chemically, biologically and physically to remove undesirable components which contribute to a total oxygen demand (TOD) which is normally made up substantially of a biological oxygen demand (BOD) and a chemical oxygen demand (COD). Chemical treatments of the usual types add other materials to the waste effluents and while these may not be noxious, their presence is still often undesirable. Biological treatments, while quite effective with respect to the more readily oxidizable organisms and chemicals of the effluents, are often ineffective against aromatic or "refractory" contaminants. Physical treatments, such as adsorption, which may often be by activated charcoal or activated aluminum hydroxide, are expensive and adsorption requires facilities for regeneration of the adsorbent. Accordingly, there is a need for useful process by which aqueous media containing dissolved, emulsified or other dispersed contaminants which are difficultly removable by mechanical means can be removed from the medium effectively, economically and safely.

In the past a promising means for removing the usual objectionable materials from waste effluents has been oxidation by means of such oxidizing agents as ozone, oxygen, air, hydrogen peroxide, per-compounds, such as potassium permanganate, chlorine and chlorine dioxide. Using some oxidizing agents the contaminants could be oxidized to less noxious compounds, such as water and/or gases, such as carbon dioxide, which are either completely unobjectionable or easily removable from the waste stream. The oxidizing agents may also remove the heavier metal compound impurities by converting the metals to insoluble oxides thereof which do not create any oxygen demand. While such oxidizers have been found quite useful in the treatment of drinking water supplies, either they are expensive or the equipment for mixing them in with the waste waters is expensive and therefore the cost is unduly high. Additionally, because waste streams are often of varying or unknown compositions and some oxidants are specific in their effects the waste water might sometimes be undertreated and other times might be overtreated. In some cases the reaction time is slow and the waters must be held for objectionably long periods in contact with the oxidant for it to be effective. In other cases pH adjustment is critical, requiring additional treating chemicals and close control of the proportions thereof employed. Often residual or organic and other materials remain after treatment with a chemical oxidant. Ozone generators are expensive and sometimes "tunnel" through the medium being treated, causing a diminution in the generation of active ozone. Per-compounds are usually expensive and chlorine oxidation of waste waters may produce undesirable chlorinated organic products, some of which may be more poisonous than the contaminants originally present.

Waste waters, such as municipal sewage treatment plant discharges, have been treated electrochemically in the past. Usually such treatments have been with direct current but it has also been known to reverse the direct current periodically to clean the electrodes and alternating currents have been superimposed on direct currents. In some instances, as in the disclosures of U.S. patents 586,643; 741,231; 3,336,220; 3,616,356; and 3,799,851; and Australian Patent 239,036, alternating currents have been employed in the treatments of aqueous media. Yet, in none of those cases were the features of the present invention reported nor were the desirable results obtained mentioned. In various direct current electrolyses packed beds have been employed and electrode materials have been coated with catalysts. See U.S. Patents 3,616,356; 3,719,570; 3,728,238; 3,730,864; 3,755,114; 3,764,497; 3,764,498; and 3,766,034. However, none of these references describes the present invention and none would lead one to expect the obtaining of the unexpectedly beneficial results noted in the practice thereof.

In accordance with the present invention a process for the removal of oxidizable contaminants from an aqueous medium comprises applying an alternating current of a frequency of 0.5 to 800 Hz to a pair of electrodes in contact with the contaminated aqueous medium, with catalyst-containing particles in the medium between the electrodes, the catalyst of which particles is an oxidation catalyst selected from the group consisting of a metal oxide of any of Groups IVa, Va, VIb and VIIb, and mixtures thereof. In preferred embodiments of the invention the catalyst-containing particles are particles in a bed which are coated with a suitable oxide such as one of manganese, chromium, bismuth or lead and they may be mixed with particles of activated carbon and/or graphite, the alternating current is at a frequency of 10 to 400 Hz, certain particle sizes of the bed packing are employed, the electrodes are of particularly described materials and preferred voltages, current densities, temperatures and pH's are utilized. Also within the invention are suitable apparatuses. In other aspects of the invention "hard" and "soft" catalyst beds are used to further improve decontamination of phenolic solutions and applications of higher current densities to working cells are used to "push out" contaminants held on particle surfaces, thereby renewing the catalytic particles and concentrating the solution of contaminant produced.

The use of alternating current in the present process unexpectedly results in removal of various oxidizable contaminants from aqueous media whether such contaminants are present therein at high or low concentrations. Furthermore, it is also noted that when other contaminants are present, such as amides, amino acids and betaines the alternating current may also cause reductions in the presence of hydrogen peroxide, which can function as a reducing agent. In some cases, a cell may be made which includes a combination of oxidizing and reducing catalysts or catalyst beds (and oxidizing and reducing reactants made therein). However, in most cases, the employment of an oxidation catalyst or a mixture or sequence of such catalysts suffices since the most objectionable contaminants are usually best removed by oxidation. Sometimes the passage of aqueous medium to be treated may be sequentially through compartments containing oxidizing and reducing catalyst particles and/or beds, or "hard" and "soft" catalysts and/or beds (meanings of these terms will be given later) or different hard or soft catalysts and/or beds.

The invention will be readily understood from the following description, taken together with the drawing in which.

Figures 1, 2, 3:
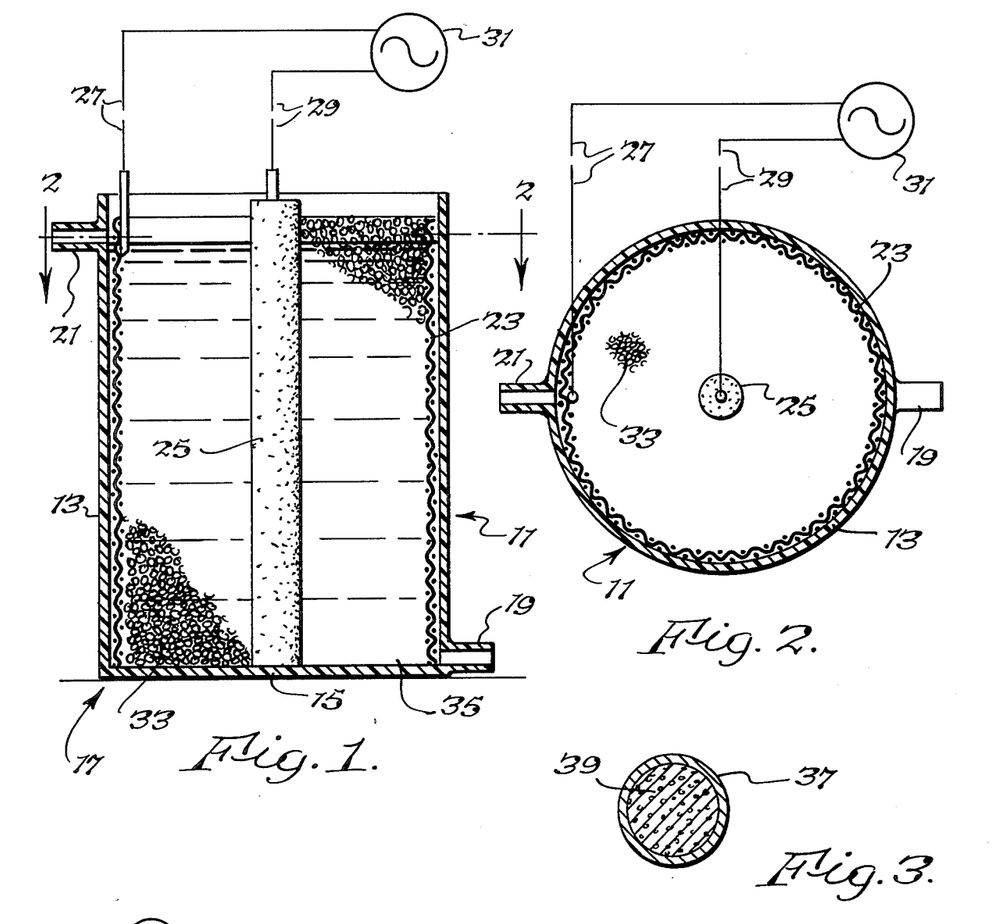
FIG. 1 is a central vertical sectional view of an electrolytic cell of this invention, utilized to remove oxidizable contaminants from aqueous media.
FIG. 2 is a horizontal sectional view along plane 2—2 of FIG. 1.
FIG. 3 is a cross-sectional view of an oxidation catalyst-coated packing bead with which (and with other optional packing materials) the electrolytic cell is filled.

Electrolytic cell 11, constructed of a suitable electrolyte-resistant material such as glass, glass-lined steel, synthetic organic polymeric plastic or rubber or fiberglass-reinforced synthetic organic polymer, includes cylindrical side wall 13 on a circular base 15 to form a bottomed cylindrical container 17 for the cell. Inlet 19 and outlet 21 are provided for the passage of contaminant-laden aqueous medium into the cell and for withdrawal of the medium from which at least some contaminant has been removed. A suitable electrode 23 is provided around the inner circumference of container 17. Preferably, it is foraminous and most preferably it is of a woven-type screen of suitable material, e.g., stainless steel. In the center of the cell is a cylindrical electrode 25 of suitable material, e.g., graphite. The electrodes are communicated via connecting wires or cables 27 and 29 to an alternating current source 31. The cell is filled with catalyst-containing packing 33 forming a bed therein containing aqueous medium 35 or electrolyte containing contaminant to be removed therefrom in the interstices.

Figure 4:
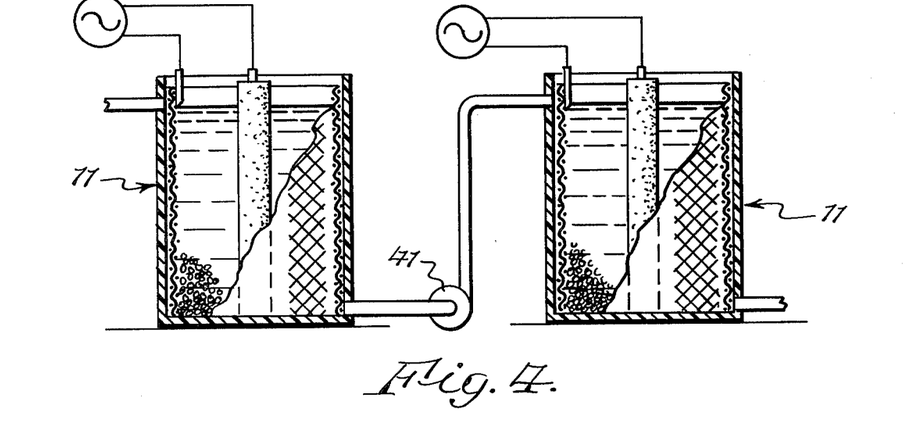
FIG. 4 is a central vertical sectional view of a pair of electrolytic cells of this invention arranged in series for better contaminant removal from the medium being treated.

In FIG. 3 there is illustrated a coated particle of packing material. In the particular particle shown a coating of manganese dioxide 37 has been produced by pyrolysis on the surface of a perlite (porous volcanic glass) bead 39. In FIG. 4 an apparatus of a variation of the invention is shown wherein a pair of electrolytic cells is arranged in series so that after partial removal of contaminant from the medium in the first cell additional removal may take place in a second cell. Various parts of the cell are not identified by numerals because they correspond to those of FIG. 1 in each case, with optional changes in the packing materials, alternating current frequencies and electrodes. Pump 41 is employed to convey the material from the first treating cell, on the right in the drawing, to the second cell and to force the medium through such second cell. In a preferred embodiment of the invention the first cell is a hard cell and the second (on the left of FIG. 4) is a soft cell.

The operation of the cells and the carrying out of the processes of the invention are clear from the drawing. Suffice it to say that the aqueous medium to be purified is fed into the cell, preferably through an inlet at the bottom thereof, and is passed through it at such a rate that the product exiting has had a desired proportion of the contaminant removed from it, which may be by conversion to water and carbon dioxide or to other subcompounds of the treated contaminant due to the application of the alternating current in an operative frequency range. Analyses are made of the contaminant present in the effluent and the process is modified accordingly, sometimes with changes also being made in the frequency of the alternating current so as to obtain best contaminant removal. The cells may be arranged in series, as illustrated in FIG. 4 or in parallel or in various combinations thereof.

The aqueous medium being treated may be any aqueous medium containing contaminant(s). Preferably it contains oxidizable contaminants at a concentration of up to 50,000 parts per million (although concentrations of 200,000 p.p.m. are treatable) but normally the concentration is in the range of 10 or 50 to 5,000 p.p.m. and preferably is 200 to 2,000 p.p.m. The contaminant is usually dissolved or colloidally dispersed, as in an emulsion, but may also be present as very finely divided non-colloidal particles. Normally it is preferred that no large solid particles be present because such could interfere with cell operation by causing plugging of the cell. While the oxidizable impurities are removed effectively by the processes and apparatuses of this invention they may be accompanied by reducible contaminants and even by inactive contaminants and in some cases it has been found that these, too are usefully converted to more acceptable forms. In some cases, reducible contaminants are removable by a corresponding process wherein reducing catalysts such as metals, e.g., nickel powder, and other metal oxides, e.g., nickel oxide, are employed on the particles of the particulate cell bed. While various types of feeds and effluents may be treated by the present invention to remove contaminants, most successful results have been obtained in the removal of oxidizable impurities, such as phenolic compounds, especially phenol. Additionally, effective contaminant removal is obtained in the treatment of cyanides, woodpulp mill effluents, plating effluents, spent pickling brines, sewage treatment plant effluents and discharges from chemical plants, steel mills, and oil refineries. Such wastes will usually contain phenolic compounds, e.g., phenol, cresol, toluene; chromates, e.g., $Na_2CrO_4$, $K_2Cr_2O_7$, (which may be reduced to trivalent chromium ions); cyanides, e.g., NaCN, which may be converted to $CO_2$ and $N_2$ or $NH_3$; and/or other oxidizable impurities, e.g., lower esters, ethers, alcohols, aldehydes, ketones, sugars and hydrocarbons.

In the practice of the invention the amount of insolubles, other than in a colloidal phase, will normally be held to less than 1%, preferably less than 0.1% and most preferably less than 100 p.p.m. in the contaminated medium being treated.

The electrolyzing apparatus or electrolytic cell employed comprises a container, a pair of electrodes, catalyst-containing particles and a source of alternating current of suitable frequency. The container may be of any suitable known material resistant to the action of the electrolyte and the electrolytic currents. Suitable container materials may be selected from those materials of construction which have been found successful for electrolytic cells in the past, including glass, stainless steel, steel, carbon, especially graphite, polyethylene, polypropylene, polyvinyl chloride, after-chlorinated polyvinyl chloride, polyvinylidene fluoride, bitumen, porcelain, fiberglass-reinforced polyester and rubber, especially neoprene. The containers or cells may be entirely of such materials or may be faced with them, as is most suitable. The containers are preferably vertical with an inlet or inlets near the bottom and an outlet or outlets at the top thereof, with an electrode being located along the axis of the container and another along the periphery thereof but other suitable structures may also be employed. For example, the electrolytic cell may be in a form of a pipe through which the aqueous medium to be purified is passed.

Electrodes may be of suitable materials known to be useful for such purpose, including stainless steels of various types, graphite, titanium coated with ruthenium dioxide, titanium coated with manganese dioxide, titanium coated with platinum, amorphous carbon and platinum, which are some of the preferred materials, but other electrode materials may also be used. The stainless steel employed is normally an austentitic stainless steel of Type 304 (best) 306, 316 or 317 but other chromium-nickel-iron alloys may also be used. It is most preferred to employ a central electrode, preferably of graphite, and a surrounding electrode, preferably of stainless steel mesh or screening of about 2 to 10 strands per millimeter, e.g., 14 mesh or 14 strands per inch. However, the electrodes may be in the forms of flat screens, cylindrical or flat sheets, bars, hollow members, perforated cylinders and in some cases the container itself may be an electrode. In addition to the favored electrode materials previously mentioned there may also be utilized various other conductors, e.g., platinum-palladium alloys, precious metal-plated base metals, e.g., gold plated steel and graphite-amorphous carbon mixtures bound together by synthetic organic polymers or resins. However, as was previously indicated, the preferred electrode combination is a solid graphite cylinder surrounded by a cylindrical stainless steel mesh.

Any conventional means for connecting a source of alternating current to the electrodes may be utilized and similar means may be employed to connect the electrodes in series or in parallel with those of other such electrolytic cells. While direct connection to a supply source of 50 Hz or 60 Hz AC will usually be made it is preferred if means are included in the apparatus for varying the frequency of the alternating current within the ranges described herein, 0.5 to 800 Hz and 10 to 400 Hz but when such wide range variation is not available variation within a more preferred range, 25 to 200 Hz, may be useful. In addition to the employment of alternating current in the present apparatuses and processes, which yields the surprisingly beneficial effect of improved oxidation of oxidizable impurities, it is important to have catalyst-containing particles in the electrolytic cell or container between the electrodes, the catalyst of which is an oxidation catalyst of a certain type. For reactions which are primarily oxidations, such as the conversion of phenol to carbon dioxide and water, the oxidizing catalyst is a metal oxide wherein the metal may be any of Groups IVa, Va, VIb and VIIb. Mixtures of such oxides and sequential treatments with them may also be employed. The metals of the groups mentioned include germanium, tin, lead, antimony, bismuth, chromium, molybdenum, tungsten, manganese, technetium and rhenium. Of these metal oxides those of lead, bismuth, chromium and manganese are much preferred, with chromium and manganese oxides being the most preferred. The oxides normally utilized are $PbO_2$, $Bi_2O_3$, $Cr_2O_3$ and $MnO_2$. Of course, because technetium is a fission product its oxide is not considered to be a practical catalyst for the present reactions.

While the oxides may be employed in particulate form, without being coated onto or incorporated in carriers, it is much preferred that they be used as coatings on carrier particles. The carrier particles may be conductive, semi-conductive or nonconductive but generally it is preferred to utilize the nonconductive bases. Such bases may be of various shapes, porosities and structures but for the practice of the present invention it has been found best to utilize perlite, an expanded volcanic glass, which is usually in approximately spherical form and of over 50% (e.g., 55 to 75%) voids. The sizes (diameters or equivalent diameters) of the porous glass particles or other base particles coated with catalyst are normally in the range of 250 microns to one centimeter, preferably 0.3 to 4 mm., more preferably about 1 to 4 mm. and most preferably 1 to 3 mm. A mixture of sizes is preferred to fill void spaces, e.g., a mixture of equal volumes of 1 mm. and 3 mm. dia. particles. In addition to perlite bases for the catalyst coating various other materials may also be employed, including graphite, amorphous carbon, synthetic organic polymer, e.g., nylons, polyurethane foams and polyacetal resins, ceramics, such as porcelain, and glasses other than perlite. The coatings of catalysts on such beads or particles will normally be such that the catalyst-coated particles contain from 10 to 90% by weight of the catalyst, preferably 20 to 80%, more preferably 30 to 70% and most preferably about 35%. Thus, with a manganese dioxide coating on 3 mm. diameter perlite particles the percentage by weight of $MnO_2$ will be preferably about 30% but with 1 mm. diameter perlite particles it will preferably be about 40%. The thickness of such coating can be monomolecular but is usually from about ten microns to two millimeters, preferably from 100 microns to 500 microns. The various catalytic coatings of the types described may be applied to suitable carrier particles by pyrolysis techniques, such as by vacuum impregnation of porous perlite spheres with a 10 to 50%, e.g., 25% metal nitrate or other soluble salt solution, wherein the metal is that of the desired metal oxide catalyst, followed by pyrolysis of the metal salt above its decomposition and at a temperature sufficient to form the desired oxide, e.g., about 400° C., for $Mn(NO_3)_2$ and corresponding chromium, bismuth and lead nitrates. By such pyrolysis methods, some of the "coatings" may be in the interior of the porous particles but the weight thereof is still considered in calculating the proportion of metal oxide "coating" present on the particles. When the base material is unstable to pyrolysis conditions the catalysts may be sputtered onto the substrate, vacuum deposited or cemented or may be otherwise mechanically held thereto, as by being forced into surface voids, or may be held by a fused surface portion of the substrate.

In some preferred apparatuses and processes of this invention, in addition to the metal oxide-coated particles (usually perlite) present in the electrolytic cell, other particles too may be present such as those of activated carbon and/or graphite or corresponding adsorptive and conductive particles. The graphite particles improve the conductivity of a packed bed in the electrolytic cell and thereby often increase the electrolytic effect and oxidation of the oxidizable contaminant. In effect, they help to form a plurality of mini-cells in the cell. The activated carbon also helps to remove some impurities from the contaminated medium and often allows selective adsorption and desorption of such impurities, in addition to the oxidation or other reactions thereof (which can include reduction) effected in the present cells. Instead of activated carbon and graphite other adsorbent and conductive particulate materials may be utilized and in some cases it may be considered unnecessary to employ the conductive or adsorbent particles. Particle sizes of the more conductive materials (including activated carbon) may be about the same as those of the catalyst-containing particles. Usually ranges are from 250 microns to 1 cm., preferably about 0.7 to 2 mm. in diameter. Usually for the electrolytic treatment of refractory or difficultly oxidizable contaminants, such as phenol, "hard" cells or beds which include only the catalyst-coated particles are employed while for treatment of more readily oxidizable compounds "soft" cells, containing activated carbon and/or graphite too, are favored.

Although it is highly preferred that the catalyst-containing particles and other particles in the electrolytic cell should be in a packed bed form, it is contemplated as within this invention to utilize particles which are being circulated in the aqueous medium rather than being maintained in a static bed. In such cases, as well as when a bed is employed, the proportion of metal oxide catalyst-coated particles to other particles present, including adsorbent particles and those of greater conductivity present, by volume, may be from 5 to 95%, preferably 20 to 80% and most preferably 30 to 70% of the oxide-coated particles, with the balance being the other particles, for "soft" oxidation cells. Such proportion will usually be about 100% metal oxide-coated particles for "hard" oxidation cells. For example, for the soft cells one could use 25 to 75% of catalyst particles and 75 to 25% of activated carbon or charcoal, e.g., 50% of each, by volume. For the hard cells $MnO_2$-coated perlite alone is often best. In embodiments of the invention wherein catalyst-coated material, activated charcoal and graphite are used, about 20 to 80% of the metal oxide catalyst-coated material, about 10 to 40% of activated charcoal or activated carbon and about 10 to 40% of graphite, by volume, are usually employed, with more preferred ranges being 30 to 70%, 15 to 35% and 15 to 35%, respectively. In some instances only graphite particles may be employed, as when one is making $H_2O_2$ for recovering (without reacting it with a contaminant). Normally, in all the described packed beds the particles will occupy from 5 to 95% of the volume, preferably 10 to 90% thereof, more preferably 50 to 83% thereof (1:1 to 5:1 ratio range of particle volume to free space) and most preferably 67 to 83% (2:1 to 5:1), with the balance being the voids or free spaces which are capable of being occupied by the aqueous medium. For example, using 50% of $MnO_2$-coated perlite, 25% graphite and 25% activated carbon particles, the proportions thereof are 2:1:1 and the particles occupy about 75% of the cell volume, exclusive of electrodes. Thus, the voids total about ⅓ of the sum of the particle volumes in such soft cells.

The various operating conditions for the present electrolysis, the control of which is important for the obtaining of best results, include AC frequency, voltage, current density, temperature, pH and residence time. The alternating current employed may be of any suitable wave shape, including sine, square wave, modified sine and other wave forms but it is usually important to have a balanced wave form, one in which the current flow in one direction is equal to that in the other. Thus, an alternating current superimposed on a direct current will usually be unacceptable. The frequency of the alternating current should be in the range of 0.5 to 800 Hz, preferably 10 to 400 Hz and most preferably 25 to 200 Hz. Normally, 60 Hz AC will be used but 50 Hz AC is also satisfactory and is sometimes more readily available. The voltage will be from 1.67 to 150 volts, preferably 10 to 50 volts and more preferably 15 to 40 volts. The lower limit, 1.67 volts, is the decomposition voltage of water and the higher limit is a function of the conductivity of the particle bed and electrolyte (including the percentage of conductive particles present). The current density will be in the range of 0.1 to 30 amperes per square centimeter, preferably 0.5 to 1.5 or 2 amp./sq. cm. The operating temperature will be from 5 to 95° C., preferably 20 to 60° C. and more preferably about room temperature, e.g., 20 to 35° C. The pH will normally be in the range of 1 to 12, usually 3 to 10 and most of the time 3 to 8 but is variable, depending on the type of contaminant to be treated. Residence time in the electrolytic cell for the medium from which contaminant is being removed will usually range from five seconds to an hour and is preferably from 30 seconds to two minutes. However, it should be recognized that it is proportional to the load of organics or other species present, including salt content.

Although the desired conditions are as recited above it will be evident that in a particular situation variations therein may be made so as to obtain best removal of a particular contaminant. However, generally the frequency of the AC current will have to be greater than 0.5 Hz and less than 800 Hz. At frequencies lower than 0.5 Hz the AC current acts essentially like a DC current, with all the disadvantages thereof, including erosion and chemical reactions of electrodes and production of objectionable coatings on electrodes, causing correspondingly higher voltage drops and lesser and different electrolytic effects. At above 800 Hz little oxidation or desired electrolytic effect is obtained due to the very rapid changing of current direction and consequent loss of interfacial polarization.

In the present reactions, together with the hydrogen peroxide or radical thereof (OH) produced and consumed in reacting with a contaminant there is concomitant production of hydrogen. The reaction is preferably carried out at atmospheric pressure, although closed electrolytic cells and the employment of super- and sub-atmospheric pressures, e.g., 0.1 to 10 atmospheres, are also feasible.

In other modifications of the present processes the packed bed may be used as an adsorbent for impurities present in the contaminated aqueous medium, taking such contaminants out of solution during the electrolytic reaction and then releasing them, when desired, by imposition of a higher current density on the cell. For example, if the voltage or current density is increased by 50% or more during operation of the cell there will be an initial push-out of adsorbed contaminant from the cell or from other adsorbent containing contaminant so that the effluent will have a higher concentration of contaminant than had been the case when operating at the lower voltage or current density (or when operating non-electrically). Such process may be applied to recovery of the contaminant when desired, in greater concentration than present in the contaminated aqueous medium.

It has also been observed that the application of an alternating current, such as one of about 60 Hz, to activated carbon or activated charcoal in an electrolytic cell bed, increases the adsorptivity of the charcoal markedly, often to 50% or more greater than its normally regenerated adsorptive capacity. Such effect also takes place in the absence of the oxidation catalyst particles and in the absence of the graphite or other conductive particles.

The following examples illustrate the invention but are not to be considered as limiting it. Unless otherwise specified, all parts are by weight and all temperatures are in ° C.

EXAMPLE 1

Employing an electrolytic cell of the type illustrated in FIGS. 1 and 2, the following experiment is effected, in which an alternating current is passed through an aqueous solution of phenol (a contaminated aqueous medium), utilizing different catalyst-containing particles as packings for the electrolytic cell. The flow cell employed, through which aqueous medium is passed via an inlet at the bottom and from which it exits through an outlet at the top, includes a 3.9 cm. dia. by 7.4 cm. high cylindrical bed of small catalyst particles. The electrode is of electrode quality carbon rod, 0.6 cm. in dia. and is positioned at the center of the cell and is almost as tall as the cell. A Type 306 stainless steel 14 mesh screen of cylindrical shape is positioned along the inside wall of the cell. The total volume of the cell is about 75 cc., of which about 30 cc. is void volume (volume not taken up by particles). The frequency of the AC current employed is 60 Hz and the concentration of phenol in the solution charged to the cell is 1,000 p.p.m., the balance of the solution being water. Phenol concentrations before and after treatments are measured by converting the phenol to a colored complex and measuring the light transmittance of such complex in an aqueous medium by spectrophotometric means or by color comparisons.

Perlite particles of diameters in the 2 to 3 mm. range (good results are also obtained when about equal volumes of 1 millimeter diameter and 3 mm. diameter particles are provided) are coated with manganese dioxide by pyrolysis of a 25% manganese nitrate solution after vacuum impregnation thereof. The spheres resulting contain about 35% by weight of the manganese dioxide and the thickness of the coating on the surface of the perlite particles is about 300 microns. The manganese dioxide-coated perlite particles constitute the particulate bed packing material of the cell.

The pH of the phenol solution to be treated is about 7, the flow rate is about 7.5 cc./min., the current flow is at an average of about 0.3 ampere (ranging from 0.08 to 0.54 ampere) and the voltage averages 70 volts, ranging from 30 to 110 volts. Phenol is removed from the solution treated at an average rate of 13 milligrams per ampere-minute, which is almost thirty times better than when the uncoated perlite particles alone are employed as the bed material and over two hundred times greater than with the electrodes only (without any packing). Similar results are obtained with the use of the same sized perlite particles coated with chromium oxide ($Cr_2O_3$) when the flow rate is 7.5 cc./min., the average AC current flow is about 0.16 ampere and the average voltage is about 60 volts. In such test the average removal of phenol is at the rate of about 21 mg./amp.-min., which is about forty times better than with uncoated ceramic or perlite particulate packing and over three hundred times better than with the electrodes only. In both experiments 60 Hz AC is used. Similar results are obtained when the voltages are lowered to 40 volts and when current densities are varied over the 1 to 10 amp./sq. cm. range.

Useful, although not as good results are obtained when bismuth oxide-coated perlite particles of the same type are employed instead of those coated with $MnO_2$ and $Cr_2O_3$. At an average flow rate of about 7 cc./min., the amount of phenol removed is about 3 mg./amp.-min., which is about six times better than with the uncoated perlite packing and about fifty times better than with the electrodes only. In this experiment the current flow is at an average of about 0.13 ampere and the voltage is 50. Similarly, when porous perlite spheres are lead oxide-coated by the same pyrolysis methods previously described, the AC current average is about 0.14 ampere, the voltage is 40 volts and the flow rate averages about 6.2 cc./min., the phenol removal rate is at an average of about 0.6 mg./amp.-min., which is measurably better than with untreated perlite packing and over ten times better than with electrodes alone. All the previously mentioned experiments take place over periods of about 5 to 8 hours so they fairly represent actual cell use operations and not just start-up conditions.

To test the use of different bases for one of the excellent catalytic coatings, manganese dioxide coatings of the same type are applied to the surfaces of granular graphite and activated granular charcoal carbon of substantially the same particle sizes and these are employed in tests corresponding to those previously described in this example. Using the granular graphite coated with manganese dioxide, at an average current flow of 0.4 ampere and at an average voltage of 18, with a flow rate of 6.7 cc./min., for a test time of nine hours, the average phenol removal rate is 2.6 mg./amp.-min., which is about 2.5 times the rate for an uncoated graphite bed and almost fifty times the rate for electrodes only. With activated granular charcoal as the base material for the manganese dioxide, with an average current flow of 0.84 ampere and a voltage of about 14.5, at a flow rate of 7 cc./min., over a test time of five hours, the average rate of removal is 3.7 mg. of phenol per ampere minute, about twice that of the plain activated granular charcoal and about sixty times that with only the electrodes employed.

In a comparative test, utilizing a different metal oxide, nickel oxide, as the pyrolyzed coating on the surface of the perlite particles, with 60 Hz, 40 volts, 0.12 ampere AC and a liquid flow rate of 7.3 cc./min. over a test period of seven hours, no phenol at all is removed. In the various tests described similar results are obtainable with other particle substrates are utilized, such as polymeric plastics, e.g., nylon; non-porous glass; sand;

and porcelain, and when the oxide particles are held to the surfaces of any of the bases described in the specification by cement, fusion or other mechanical means. Similarly, when the particle sizes are varied within the 0.3 to 4 mm. dia. range, being either all of one size or being mixtures of sizes within the range, such results are obtained. Furthermore, although during the described tests the temperature used is 25° C. and the concentration of phenol employed is 1,000 p.p.m., when these conditions are varied over the 20 to 60° C. range and with concentrations from 200 to 30,000 p.p.m., comparable effects are obtainable. This is also so when the pH is varied from 1 to 12 and when aromatic or other phenolic impurities such as cresol, resorcinol and toluene are substituted for phenol, either in whole or in part. Similar improvements in contaminant removal result with other oxidizable and sometimes reducible organic and inorganic contaminants too, such as those mentioned in the specification.

Although various conditions of current flow, voltage, frequency and residence time in the cell are described in the experiments reported previously, these too may be varied, with the current density being changed within the range of 0.1 to 30 amperes/sq. cm., the voltage being in the range to 5 to 50 volts and the current flow being from 0.05 to 2 amperes at frequencies of 25 Hz, 50 Hz and 100 Hz and similar results are obtained. The various changes mentioned are effected alone and in combination and the desired results are obtained. This is also true when the electrode materials are reversed or otherwise changed, as per the specification description. Also, when the contaminated solution is changed, so as to be sewage treatment plant effluent, waste water from a plant for the manufacture of phenol-formaldehyde resin, nickel and chromium plating bath wastes and/or cyanide-containing industrial waste waters, the uses of the described cells under the described conditions results in significant reductions in BOD, COD and consequently, TOD. Similar results are also obtainable using $MnO_2$ and $Cr_2O_3$ particles of the same sizes, without substrates such as the perlite or other base materials, and when mixtures of such materials and mixtures of the catalyst-coated particles are employed.

EXAMPLE 2

A comparison between the use of alternating current and direct current is made in the treatment of an aqueous solution containing 1,000 parts per million of phenol, utilizing porous ceramic spheres of the type described in Example 1 (2 to 3 mm. dia.) coated with about 35% of bismuth oxide. The AC frequency is 60 Hz, the average current is 0.13 ampere, the voltage is 50, the average temperature is about 36° C., the flow rate is about 7 cc./min., and the average rate of phenol removal is 3 mg./amp.-min. With a comparable DC cell, using manganese dioxide-coated ceramic spheres plus granular graphite (60:40 volumetric ratio) with a current flow of 0.3 ampere, an average voltage of about 49, an average phenol removal rate of 9.5 mg./amp.-min. and an average cell temperature of about 65° C., over a period of 7.5 hours it is noted that the cell resistance increases appreciably (by 36%). Inspection of the anode shows it that it is covered with gummy organic layer which is responsible for the increase in resistance. On the contrary, the AC cell, after 7.5 hours and even after testing for much longer periods of time, exhibits no evidence of foulings of electrodes by depositions of organic decomposition products, either by visible inspection or by an increase in electrical resistance. Similar results are obtained when the bismuth oxide-coated particles are used in DC operations and $MnO_2$-coated particles are the packing in an AC process.

EXAMPLE 3

The beds of the cells of Examples 1 and 2 which included only metal oxide-coated substrate materials are considered to be "hard" beds, primarily useful for treating aqueous solutions of difficultly oxidizable materials, such as phenols, phenolic compounds and other aromatics. Such beds may have comparatively high resistances and it has been found that such resistances may be diminished (in effect, a plurality of mini-cells may be produced) by incorporating with the catalyst coated particles (such as $MnO_2$ or $Cr_2O_3$-coated perlite) activated carbon or graphite in granular forms, with the former being preferable. These particles are superior to support electrolytes which will bring down the cell resistance ionically but which are costly and change the chemistry of the water being treated. Thus, it is found that when employing cells having bed volumes of 100 cc. packed with particles of the sizes previously described which include $MnO_2$-coated perlite and activated charcoal in varying proportions, with the electrodes being a central 0.6 cm. graphite rod and a surrounding stainless steel sieve like that previously described, the resistance between the electrodes decreases from 116 ohms at 80:20 catalytic:charcoal particles volumetric ratio to 13.5 ohms at a corresponding 20:80 ratio. A similar effect is noted with graphite being employed in place of activated carbon.

A mixture of 50% by volume of the previously described $MnO_2$-coated porous perlite beads, 25% by volume of activated charcoal particles approximately the same size and 25% by volume of similar graphite particles is made and the AC cell treatment of an aqueous solution containing 1,000 p.p.m. of phenol is effected at various flow rates from 40 to 105 cc./min. with treatment times ranging from 0.6 to 4.4 hours, the frequency being 60 Hz, the current being about 4 amperes, the voltage being about 26, the resistance being about 6 ohms and the temperature being about 63° C. The phenol removal rate is normally in the range of 5.3 to 7.4 mg./amp.-min., with an average of 6 mg./amp.-min., which is about 60% of that of 100% $MnO_2$-perlite particles, without the presences of the carbon particles. However, the resistance, of about 6 ohms, is only about 2% of the resistance of the cell containing 100% of the corresponding $MnO_2$-coated perlite particles. Similar effects are produced when the electrodes are both carbon, both stainless, reversed in location and/or when the stainless steel mesh is replaced by a stainless steel or ruthenium oxide on titanium sheet and/or when the cylindrical central electrode is replaced by a rod of square cross-section or a hollow tube.

EXAMPLE 4

The same test cell described in Example 2 is employed to treat a 1,000 p.p.m. aqueous phenol solution. Tests are run at room temperature and the effects of frequency changes on efficiency and cell resistance are noted. Using perlite spheres of the type previously described coated with manganese dioxide, and a flow rate of 5 cc./min., phenol efficiency drops from 4.9 mg./amp.-min. to 4.2 mg./amp.-min. as the frequency is changed from 0.5 to 60 Hz and an intermediate efficiency is obtained at 2.25 Hz. The cell resistance correspondingly changes from 30 to 23 ohms, with the resistance at the intermediate frequency being 35 ohms. When a mixed or "soft" bed of 50% of the described $MnO_2$-coated porous glass (perlite) spheres, 25% granular activated charcoal and 25% of granular graphite is used in a cell, the total volume of which is 450 cc. the efficiency at 0.5 Hz is 3.2 mg./amp.-min. and at 60 Hz is 6.1 mg./amp.-min. It is noted that at frequencies above 2 Hz no organic compounds are formed during the treatments but that at 0.5 Hz a small quantity thereof, as evidenced by a yellowing of the solution, is produced. Similarly, the erosion of electrode materials, especially the erosion of the "anodes" as oxygen is formed therein, is diminished at frequencies above 0.5 Hz and is almost zero at 60 Hz and higher frequencies, up to 800 Hz. Similar effects are obtainable when a multiplicity of electrodes (in two separate sets) are employed.

EXAMPLE 5

In a test like that of Example 4 the temperature of the aqueous solution being treated is varied from about 20° C. to in excess of 60° C. It is found that the efficiency of the purification of the aqueous medium diminishes as the temperature is raised and a preferred area of operation is in the range of 20 to 60° C., most preferably 20 to 35° C. Such effects are noted with $MnO_2$-coated glass, $Cr_2O_3$-coated ceramics and mixed beds (90% $MnO_2$-coated ceramics, 10% granular graphite). These effects are noted at both acidic and alkaline pH's, too.

EXAMPLE 6

In previous examples 1-5 the treatments described are primarily those of "hard" or refractory organic materials, which are difficult to oxidize. However, the present processes are applicable to purifications of solutions of "soft" organics, too, and in some such cases too, the cells may act to reduce some of the contaminants to less objectionable products, while not converting them to $CO_2$ and water. In a soft bed containing 50% $MnO_2$-coated perlite, 25% activated charcoal and 25% of granular graphite, on a volume basis, which particles take up ¾ of the volume of the bed, the remainder being filled with an aqueous solution containing 1,000 p.p.m. of sodium cyanide, which is at a pH of 10, and in which the total cell volume is 140 cc., with the electrodes being those of Example 1 except for the fact that the mesh electrode is of Type 304 stainless steel, when an average current of 2.4 amperes at 60 Hz is applied for 140 minutes at about 4.3 volts, with the flow rate being at about 200 cc./hr. the cyanide concentration is decreased to 670 p.p.m. Thus, the cyanide has been converted to innocuous form or destroyed and previous drawbacks to electrolysis of cyanide solutions, fouling of the electrodes and low conductivity of the solution, have been overcome.

EXAMPLE 7

Using the electrodes and cell system of Example 1 but with the bed volume enlarged to 450 cc. and containing a 50:50 mixture by volume of manganese dioxide-coated perlite and activated charcoal particles of the sizes described in Example 1, effluent from a paper mill is treated after removal of suspended solids by a coagulation treatment that is the subject of my U.S. Pat. application Ser. No. 487,730. The water to be treated contains about 95 p.p.m. phenol and has a COD of 125 p.p.m. After passage through a cell at a flow rate of 750 ml./hr. a current flow of about seven amperes, a current density of about 0.3 ampere/sq. cm. and an average voltage of about five volts, the phenol level is reduced to less than 10 p.p.m. and the COD to 51 p.p.m. The current density herein given and elsewhere in the specification and the claims is based on the surface area of the central or rod electrode but may also be computed for the other electrode surface or for an average of such electrode surfaces. Although lesser removals of phenol and other contaminants are obtained, similar purifications are effected when the fixed beds of catalyst particles are replaced by moving beds of agitated mixes of lesser solids contents, e.g., ½ the solids of the other beds of the example.

In a variation of the above experiment two cells are employed, each 0.9 meter high and 20 cm. in diameter, and the beds are fixed beds. The electrodes are a central graphite rod of 3 cm. diameter and a surrounding Type 304 stainless steel 14 mesh wire screen. The cells are packed with the same bed as previously described in this example and are connected in series, as illustrated in FIG. 4 and, in other variations of the experiments, in parallel. The charge liquid is a pulp and paper mill effluent high in COD, BOD and color from which some suspended solids and about ⅔ of the COD had been removed by a coagulation treatment of my U.S. Pat. Application Ser. No. 487,730. When the current flow is varied from 32 through 50 to 75 amperes (60 Hz) the COD is further reduced from 525 p.p.m. to 267 to 236 and 193 p.p.m., respectively, when the two cells are arranged in series and to 377, 311 and 275 p.p.m. when they are arranged in parallel. Similarly, when additional cells are employed in series (e.g., 2 more) further COD reduction is obtained and when additional cells are used in parallel, maintaining the same current flows, additional COD reductions also result.

In further experiments like the series experiments of this example, a hard bed, such as one described in Example 1, is used to treat phenol-containing waste water, as in Example 1, and the effluent is subsequently passed at the same rate and with the same current density through a soft bed like those of this example. It is found that some less refractory decomposition products of phenol produced in the hard bed are further removed by the soft bed treatment.

EXAMPLE 8

Sewage, after various treatments in a municipal sewage plant is first treated to remove suspended solids and is then passed through an oxidation cell of the present invention, like that of Example 7 in which the bed, having a total volume of 450 cubic centimeters, of which 180 cc. are void volume, is 50% manganese dioxide on perlite and 50% activated charcoal. Flow is maintained at about 11 cc./min. and the current applied is five amperes AC (60 Hz) at an average of 12 volts. It is found that untreated sewage has the COD lowered from 64 to 37 p.p.m., the suspended solids lowered from 6 to 0 p.p.m. and the BOD lowered from 14 to 4 p.p.m. whereas the discharge effluent from the sewage plant after primary and secondary treatment at the plant, similarly treated in the present oxidation cell, has its COD diminished from 46 to 27 p.p.m. and its BOD decreased from 3 to 2 p.p.m.

EXAMPLE 9

Effluents from pulp and paper mills, which may be unneutralized, neutralized with $H_2SO_4$ or neutralized with HCl, are treated for removal of most of the suspended solids therein and are then passed through an oxidation cell of the type described in Example 8, using the same conditions but with an average voltage of nine volts. It is found that the total solids, suspended solids, COD and BOD are diminished dramatically in all cases, at PH's ranging from 7 to 9. In a similar test of a corresponding hard cell, wherein the catalytic particles are manganese dioxide on 15–28 mesh perlite particles, with the cell bed volume being 400 cc. and the void volume being 120 cc., pH's are varied from 1.5 to 7 at currents of 0.2 to 2 amperes and 60 Hz AC and flow rates of about 17.5 cc./min., with the input aqueous solutions containing from about 400 to 500 p.p.m. of phenol. It appears that greater efficiencies of phenol removal are obtainable under the more acidic of the conditions described although with some wastes and systems it may be desirable to use alkaline pH's and treatments.

EXAMPLE 10

An effluent that had been treated by passage through a charcoal adsorber column is subjected to two passes through a hard oxidation cell of the type described in Example 9, followed by passage through a cell containing 50% $MnO_2$-perlite and 50% of activated carbon, the latter cell being the same in other respects as that of Example 9. The initial solution to be treated contains 2,000 p.p.m. calcium, ½% sulfides, nitrates and nitrites, in mixture and 100 p.p.m. ammonia, together with organic material not adsorbed by the charcoal. The sample is first treated for the removal of suspended solids and then is passed twice through the hard oxidation cell at a flow rate of 10 cc./min. at five amperes and five volts of 60 Hz AC, followed by a pass through the soft bed cell at 6.5 cc./min. at nine amperes 60 Hz AC at four volts. There is a significant diminution in COD and BOD after such treatments and the COD is lowered even more significantly by the soft oxidation than by the two hard oxidation treatments. The reason for this behavior is attributed to the production of "softer" forms of contaminants by the hard oxidation cell, which are better further oxidized by the soft oxidation cell.

In modifications of this process the hard and soft treatments are alternated and in some cases as many as ten different beds are utilized, further improving the decontamination of the material charged. In such reactions it is noted that the hard cells are warmer than the soft cells in the initial pass and in odd-numbered passes (a pass including sending the solution through both the hard and soft cells in sequence) and the soft cells are warmer than the hard cells in the even-numbered passes. Generation of heat is an indication that exothermic chemical reactions take place in both types of cells. In a further modification of this experiment sandwich cells are made of alternating hard and soft beds and the liquid to be treated is passed through the cell and serially through the beds.

As a result of experimentation conducted with respect to adsorbent carbon used in the beds of the soft cells of this invention it has been noted that carbon may be regenerated after adsorption of organic materials thereon by being subjected to the AC treatments of this invention. Such regeneration can be effected more economically than by conventional steam treatment and the other treatments of this invention are also more economic and practicable than DC or comparable commercial purification processes. The active carbon of these examples is so regenerated.

The experiments of this Example and Examples 1 and 2 are repeated with variations in the AC frequency between 20 and 100,000 Hz being utilized. From such experiments (preferably conducted on pulp and paper mill effluents, low in suspended solids, considered to be a representative mixed contaminant) it is apparent that the present invention is operative over the 0.5 to 800 Hz range, with 10 to 400 Hz being preferred and 25 to 200 Hz being most preferred. In another modification of the process of Example 1 the current density is doubled after operation of the process for 5 hours and quickly the phenol, some of which had been adsorbed on the packing particle surfaces (where it would usually be oxidized subsequently) is pushed out, thereby increasing the discharge liquid phenol content above that charged, until equilibrium is reached.

The invention has been described with respect to various illustrations and working examples thereof but is not to be limited to these because it is evident that with the present specification before him one of skill in the art will be able to utilize substitutes and equivalents without departing from the spirit of the invention.

What is claimed is:

1. A process for the removal of oxidizable contaminants from an aqueous medium comprising:
    providing a container;
    providing a packed bed of particulate material within said container, each of said particles comprising a carrier having an oxide coating, said coating comprising an oxide of a metal selected from the group consisting of Groups IVa, Va, VIb, and VIIb, metals;
    providing a pair of parallel, elongated electrodes extending substantially through said bed coupled to a source of alternating current having a frequency of 0.5 to 800 Hz; and
    directing said aqueous medium into said container and through said bed in a direction parallel to the longitudinal axis of said electrodes while said current is applied across said electrodes to oxidize at least a portion of the contaminants therein.

2. A process according to claim 1 wherein the metal of Group IVa is lead, the metal of Group Va is bismuth, the metal of Group VIb is chromium, and the metal of Group VIIb is manganese.

3. A process according to claim 2 wherein the particulate carrier material on which the metal oxide is present as a coating is selected from the group consisting of graphite, amorphous carbon, synthetic organic polymers, ceramics and glass.

4. A process according to claim 3 wherein the container is an electrolytic cell substantially filled with a bed of particles of sizes in the range of about 250 microns to one centimeter, the metal oxide-coated particles contain from 10 to 90% by weight of metal oxide, the container includes at least one inlet and at least one outlet for the passage of aqueous medium therethrough during treatment of the medium to remove contaminants from it and the contaminated medium is passed continuously into the cell through the inlet and is discharged continuously from the cell through the outlet therefrom, with at least some of the contaminant having been removed before discharge.

5. A process according to claim 4 wherein there are present in the packed bed with the metal oxide-coated particles uncoated particles comprising at least one member selected from the group consisting of activated carbon and graphite in a proportion in the range of 1:19 to 19:1 of the metal oxide-coated particles to the uncoated particles, by volume, and the packed bed of particles is of about 50 to 83% of particles and of about 50 to 17% of free space about said particles, by volume, which free space is occupied by the aqueous medium, and the current is applied across said electrodes at a voltage in the range of 1.7 to 150 volts, a current density of 0.01 to 30 amperes per square centimeter and a temperature is maintained in said bed of 5 to 95° C.

6. A process according to claim 1 wherein the contaminated aqueous medium is contaminated with an impurity selected from the group consisting of phenol, cyanides, woodpulp mill effluents, spent pickling brines and phenol-formaldehyde resin plant wastes.

7. A process according to claim 6 wherein the contaminated aqueous medium treated contains phenol and at least part of the phenol is removed by oxidation to carbon dioxide and water.

8. A process according to claim 5 wherein the contaminated aqueous medium is contaminated with an impurity selected from the group consisting of phenols, cyanides, woodpulp mill effluents, spent pickling brines and phenol-formaldehyde resin plant wastes.

9. A process according to claim 8 wherein the packed bed of particles comprises about 25 to 75% of the metal oxide-coated material and about 75 to 25% of activated carbon by volume.

10. A process according to claim 4 wherein the -coated particles are of porous glass, the sizes of the particles in the bed are in the range of 0.3 to 4 millimeters and the proportion of the volume of the particles to the free space between them in the bed is in the range of about 1:1 to 5:1.

11. A process according to claim 8 wherein the packed bed of particles comprises about 20 to 80% of the metal oxide-coated material, about 10 to 40% of activated carbon and about 10 to 40% of graphite, by volume.

12. A process according to claim 9 wherein the cell is substantially vertical, with an inlet for the contaminated aqueous medium being near the bottom thereof and with an outlet for the medium from which at least some of the contaminant has been removed being near the top thereof, the contaminated medium is passed into the cell through the inlet and after removal of at least some of the contaminant, is discharged from the cell through the outlet, the electrodes are of a material or materials selected from the group consisting of stainless steel, graphite, titanium coated with ruthenium oxide, titanium coated with manganese dioxide, amorphous carbon and platinum and the proportion of the total of the volumes of the particles to the free space between them in the bed is in the range of 2:1 to 5:1.

13. A process according to claim 12 wherein the electrodes are of stainless steel mesh about a carbon core, the -coated particles are of porous glass, substantially spherical in shape and of diameters in the range of about 1 to 3 millimeters, the activated carbon particles are of diameters of about 0.7 to 2 mm., the proportion by volume of said coated porous glass to activated carbon particles is about 1:1, the voids between the particles are about ⅓ of the total volume of the particles, the alternating current communicated to the electrodes and applied in the electrolysis is of a frequency of about 10 to 400 Hz, the voltage is in the range of about 10 to 50 volts, the current density is about 0.5 to 1.5 amperes per square cm. and the temperature is about 20 to 60° C., the phenol content in the aqueous medium charged to the electrolytic cell is in the range of about 50 to 5,000 parts per million by weight and the pH of the medium is from about 3 to 8.

14. A process according to claim 4 wherein the coating on the -coated particles is $Cr_2O_3$, the base is porous glass and the $Cr_2O_3$ content is about 35% by weight of said particles.

15. A process according to claim 4 wherein the coating on the -coated particles is $MnO_2$, the base is porous glass and the $MnO_2$ content is about 35% by weight of said particles.

16. A process according to claim 5 wherein the coating on the -coated particles is $MnO_2$, the base is porous glass and the $MnO_2$ content is about 35% by weight of said particles.

17. A process according to claim 1 wherein the oxidizable contaminant is a phenolic compound and the concentration thereof in the aqueous medium is between 50 and 5,000 parts per million.

18. The process of claim 1 further comprising providing a second packed bed contained within the container, said second bed containing particles comprising a carrier having an oxide coating, said coating comprising an oxide of a metal selected from the group consisting of Groups IVa, Va, VIb and VIIb metals, and uncoated particles comprising at least one member selected from the group consisting of activated carbon and graphite in a proportion in the range of 1:19 to 19:1 of the coated particles to the uncoated particles, by volume;

providing a pair of parallel, elongated electrodes extending substantially through said second bed coupled to a source of alternating current having a frequency of 0.5 to 800 Hz;

subsequently directing said aqueous medium from said first packed bed through said second bed in a direction parallel to the longitudinal axis of said electrodes while said current is applied across said electrodes to oxidize at least a portion of the remaining oxidizable contaminants therein.

19. A process according to claim 18 wherein the metal oxide coating on said coated particles is selected from the group consisting of $MnO_2$ and $Cr_2O_3$ and mixtures thereof.

20. A process according to claim 19 wherein the packed bed of particles comprises about 20 to 80% of the coated particles, about 10 to 40% activated carbon and about 10 to 40% graphite, by volume.

* * * * *